United States Patent
Tsai et al.

(10) Patent No.: US 10,104,335 B2
(45) Date of Patent: Oct. 16, 2018

(54) DEVICE APPLIED TO DISPLAY AND ASSOCIATED IMAGE DISPLAY METHOD

(71) Applicant: MStar Semiconductor, Inc., Hsinchu Hsien (TW)

(72) Inventors: Meng-Yu Tsai, Hsinchu Hsien (TW); Dien-Shen Chiang, Hsinchu Hsien (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 15/452,926

(22) Filed: Mar. 8, 2017

(65) Prior Publication Data
US 2018/0054594 A1    Feb. 22, 2018

(30) Foreign Application Priority Data
Aug. 16, 2016  (TW) .............. 105126091 A

(51) Int. Cl.
H04N 7/01    (2006.01)
G09G 3/00    (2006.01)

(52) U.S. Cl.
CPC ............. *H04N 7/0127* (2013.01); *G09G 3/00* (2013.01)

(58) Field of Classification Search
CPC .................................................. H04N 7/0127
USPC .............. 348/441, 445, 561, 704, 576, 581; 382/298, 299
See application file for complete search history.

(56) References Cited

U.S. PATENT DOCUMENTS

| | | | |
|---|---|---|---|
| 8,345,070 B2* | 1/2013 | Suen ................... | G09G 3/3611 345/428 |
| 9,830,880 B1* | 11/2017 | Wyatt ...................... | G09G 5/00 |
| 2011/0063312 A1* | 3/2011 | Hong ........................ | G06T 1/60 345/530 |

FOREIGN PATENT DOCUMENTS

| | | |
|---|---|---|
| TW | 200839684 A | 10/2008 |
| TW | 201419848 A | 5/2014 |

* cited by examiner

*Primary Examiner* — Brian Yenke
*Assistant Examiner* — Jean W Desir
(74) *Attorney, Agent, or Firm* — Edell, Shapiro & Finnan, LLC

(57) ABSTRACT

A device applied to a display includes a receiving circuit, a detecting circuit, an image processing circuit and a response time enhancing circuit. The receiving circuit receives an input image signal. The detecting circuit detects a frame rate of image data of a frame in the input image signal. The image processing circuit performs image processing on the image data of the frame to generate a target pixel value of multiple pixels in the frame. The response time enhancing circuit determines multiple adjusted pixel values of the multiple pixels according to the frame rate, and outputs the adjusted pixel values to a display panel. For a pixel, the adjusted pixel values generated for the pixel under different frame rates are different.

12 Claims, 4 Drawing Sheets

DEVICE APPLIED TO DISPLAY AND ASSOCIATED IMAGE DISPLAY METHOD

This application claims the benefit of Taiwan application Serial No. 105126091, filed Aug. 16, 2016, the subject matter of which is incorporated herein by reference.

BACKGROUND OF THE INVENTION

Field of the Invention

The invention relates in general to a display, and more particularly to a method for enhancing a response time of a liquid crystal display (LCD).

Description of the Related Art

In current LCD panels, a response time enhancement technology is usually adopted to enhance the response time of liquid crystals, so as to prevent residual images and to more clearly display the images. For example, assuming that a pixel value (a grayscale value) of a pixel needs to be changed from 10 to 200, a driver circuit of a display may first set the pixel value of the pixel to 230 to accelerate driving the rotation of the liquid crystals, and the pixel value is then switched to 200 to have the pixel display the correct pixel value. However, because the above pixel value of 230 is not a luminance value that the pixel actually needs to display, certain side-effects may be brought on image display.

There are currently available technologies that dynamically change a frame rate. The frame rate is changed according to the contents of image data to allow the frames to appear smooth. However, if the same response time enhancement intensity is applied for different frame rates, the above side-effects on the image display may be even more severe.

SUMMARY OF THE INVENTION

The invention is directed to a response time enhancing method, which is capable of adopting different response time enhancement intensities under different frame rates to solve the issues of the prior art.

In one embodiment of the present invention, a device applied to a display includes a receiving circuit, a detecting circuit, an image processing circuit and a response time enhancing circuit. The receiving circuit receives an input image signal. The detecting circuit detects a frame rate of image data of a frame in the input image signal. The image processing circuit, coupled to the detecting circuit, performs image processing on the image data of the frame to generate multiple target pixel values of multiple pixels of the frame. The response time enhancing circuit, coupled to the detecting circuit, determines multiple adjusted pixel values of the multiple pixels according to the frame rate, and outputs the multiple adjusted pixel values to a display panel. For a pixel among the multiple pixels, the adjusted pixel values that the response time enhancing circuit generates for the pixel under different frame rates are different.

In another embodiment of the present invention, an image display method applied to a display includes: receiving an input image signal; detecting a frame rate of image data of a frame in the input image signal; performing image processing on the image data of the frame to generate multiple target pixel values of multiple pixels of the frame; and determining multiple adjusted pixel values of the multiple pixels according to the frame rate, and outputting the multiple adjusted pixel values to a display panel. For a pixel among the multiple pixels, the adjusted pixel values generated for the pixel under different frame rates are different.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
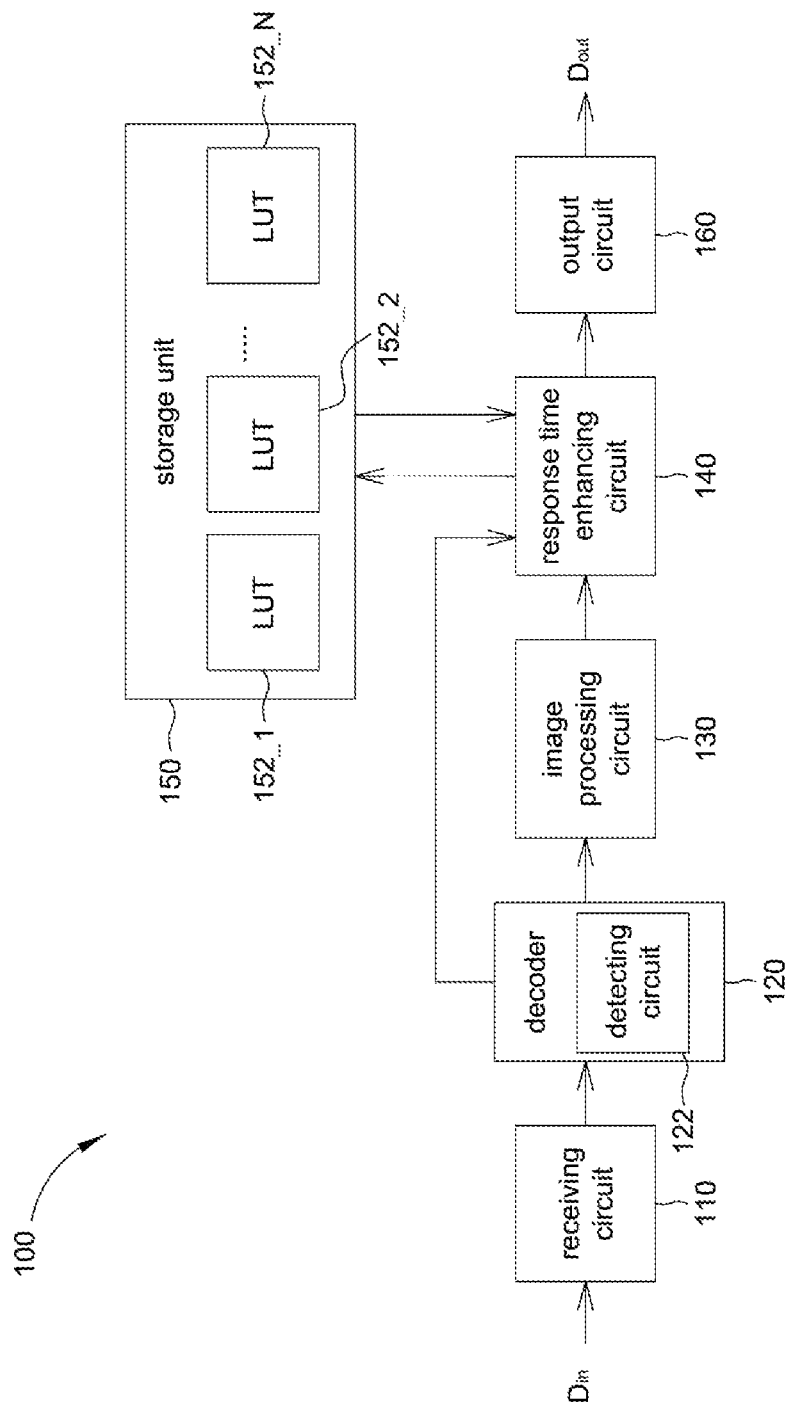
FIG. 1 is a block diagram of a device according to an embodiment of the present invention.

FIG. 1 shows a block diagram of a device 100 according to an embodiment of the present invention. As shown in FIG. 1, the device 100 includes a receiving circuit 110, a decoder 120, an image processing circuit 130, a response time enhancing circuit 140, a storage unit 150 and an output circuit 160. The decoder 120 includes a detecting circuit 122. The storage unit 150 stores look-up tables (LUTs) 152_1 to 152_N. In this embodiment, the device 100 is applied to a display, e.g., in an LCD television, and receives and processes an input image signal Din from an external device to generate output image data Dout to a display panel of the television for display. For example, the external device may be an audiovisual player or a graphics card in a computer.

In this embodiment, the device 100 is particularly applied to a situation where the frame rate of the input image signal Din dynamically changes, i.e., where the frame rate of the input image signal Din from the external device changes along with the contents of an image. For example, when contents of multiple consecutive frames in the input image signal Din change slightly (e.g., similar to a still image), the input image signal Din has a lower frame rate. Conversely, when the contents of multiple consecutive frames in the input image signal Din change drastically, the input image signal Din has a higher frame rate. Further, the device 100 of this embodiment may dynamically adjust pixel values outputted according to the frame rate of the input image signal Din, such that the liquid crystals in the display panel corresponding to the pixels may have different response time enhancement intensities. Associated operation details are given below.

In an operation of the device 100, the receiving circuit 110 receives the input image signal Din, the decoder 120 decodes the input image signal Din to obtain image data of a frame, and the detecting circuit 122 detects the frame rate of the frame. Next, the image processing circuit 130 receives the image data of the frame from the decoder 120, and performs processes such as scaling up/down and chrominance and luminance adjustment to generate target pixel values of multiple pixels of the frame. The response time enhancing circuit 140 selects a predetermined LUT from the LUTs 152_1 to 152_N in the storage unit 150 according to the frame rate of the frame provided by the decoder 120/the detecting circuit 122, and determines multiple adjusted pixel values of the multiple pixels from the predetermined LUT according to the target pixel values of the multiple pixels of the frame and pixel values of the multiple pixels of a previous frame. The output circuit 160 then outputs the multiple adjusted pixel values to the display panel for display.

In this embodiment, assuming that the frame rate of the input image signal Din changes between 30 Hz and 120 Hz, the storage unit 150 may include 9 LUTs 152_1 to 152_9. The LUT 152_1 corresponds to frame rates 30 Hz to 40 Hz, the LUT 152_2 corresponds to frame rates 40 Hz to 50 Hz, the LUT 152_3 corresponds to frame rates 50 Hz to 60 Hz, . . . , and so forth. The response time enhancing circuit 140 selects the corresponding LUT according to the frame rate of the frame provided by the decoder 120/the detecting circuit 122. For example, the LUT 152_1 is selected as the predetermined LUT when the frame rate of the frame is 30 Hz; the LUT 152_4 is selected as the predetermined LUT when the frame rate of the frame is 60 Hz. Further, in this embodiment, as the frame rate of the frame gets lower, the response time enhancement intensity that the response time enhance circuit 140 performs according to the predetermined LUT gets weaker; that is, the adjusted pixel value generated by the response time enhancing circuit 140 becomes closer to the pixel value actually to be displayed (i.e., the target pixel value to be outputted by the image processing circuit 130). In another embodiment of the present invention, the storage unit 150 may include only one LUT corresponding to a basic frame rate instead of including multiple LUTs. For example, the basic frame rate is 60 Hz to 70 Hz, and the storage unit 150 stores only the LUT 152_4. When the frame rate of the frame is lower than 60 Hz, the response time enhancing circuit 140 multiplies the response time enhancement intensity looked up from the LUT 152_4 by a gain smaller than 1—the gain gets lower as the frame rate of the frame is lower. Otherwise, when the frame rate of the frame is higher than 60 Hz, the response time enhancing circuit 140 multiplies the response time enhancement intensity looked up from the LUT 152_4 by a gain greater than 1—the gain gets higher as the frame rate of the frame is higher.

Figure 2:
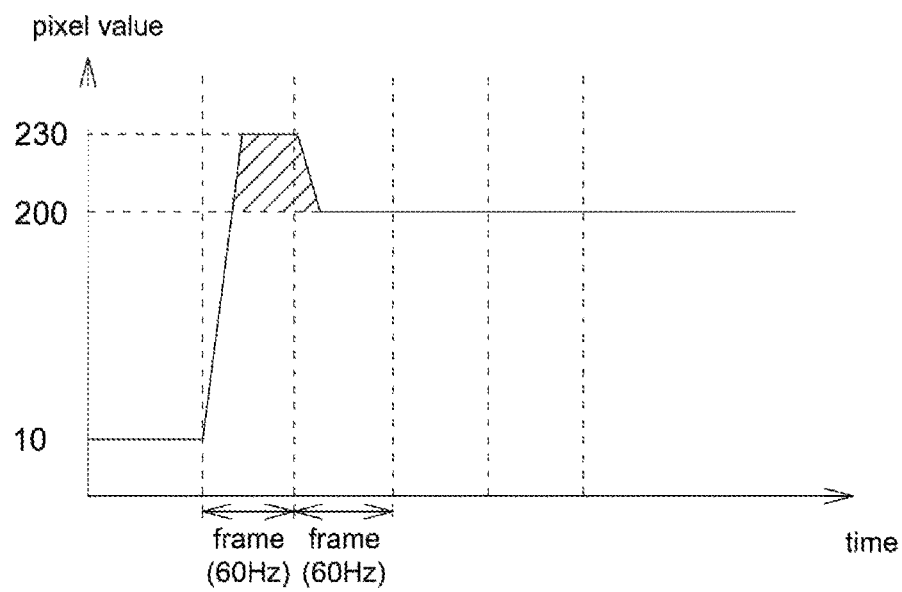
FIG. 2 is a schematic diagram of an operation of a response time enhancing circuit according to an embodiment of the present invention.

FIG. 2 shows a schematic diagram of an operation of the response time enhancing circuit 140 according to an embodiment of the present invention. In FIG. 2, the frame rate of the input image signal Din is 60 Hz. For a predetermined pixel, assume that the pixel value of the predetermined pixel in a previous frame is "10", and is "200" in a current frame and in a next frame. To enhance the response time of liquid crystals, the response time enhancing circuit 140 determines an adjusted pixel value "230" according to the LUT 152_4, and the output circuit 160 transmits the adjusted pixel value "230" to the display panel for display. In the next frame, the pixel value that the output circuit 160 outputs for the predetermined pixel is restored to "200".

The shaded part in FIG. 2 is not the real luminance value to be displayed by the pixel, and may be regarded as a reference of side-effects on the image display. A larger shaded area means the side-effects on the image display are more severe.

Figure 3:
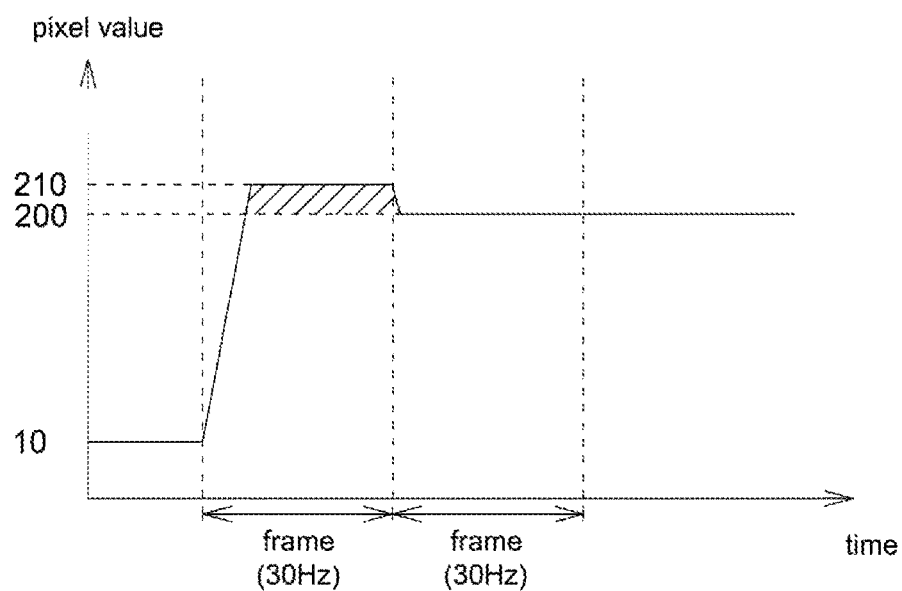
FIG. 3 is a schematic diagram of an operation of a response time enhancing circuit according to another embodiment of the present invention.

FIG. 3 shows a schematic diagram of an operation of the response time enhancing circuit 140 according to another embodiment of the present invention. In FIG. 3, the frame rate of the input image signal Din is 30 Hz. For a predetermined pixel, assume that the pixel value of the predetermined pixel in the previous frame is "10" and is "200" in the current frame and in the next frame. To enhance the response time of the liquid crystals, the response time enhancing circuit 140 determines an adjusted pixel value "210" according to the LUT 152_1, and the output circuit 160 transmits the adjusted pixel value "210" to the display panel for display. In the next frame, the pixel value that the output circuit 160 outputs for the predetermined pixel is restored to "200".

In the example in FIG. 3, because the frame rate is lower, the shaded area is expected to become larger if the adjusted pixel value is set to "230" by adopting the LUT 152_4, hence resulting in aggravated side-effects on the image display. Thus, by determining the adjusted pixel value "210" using another LUT 152_1, not only the shaded area is reduced but also side-effects on image display are not increased although the frame rate is lower.

Figure 4:
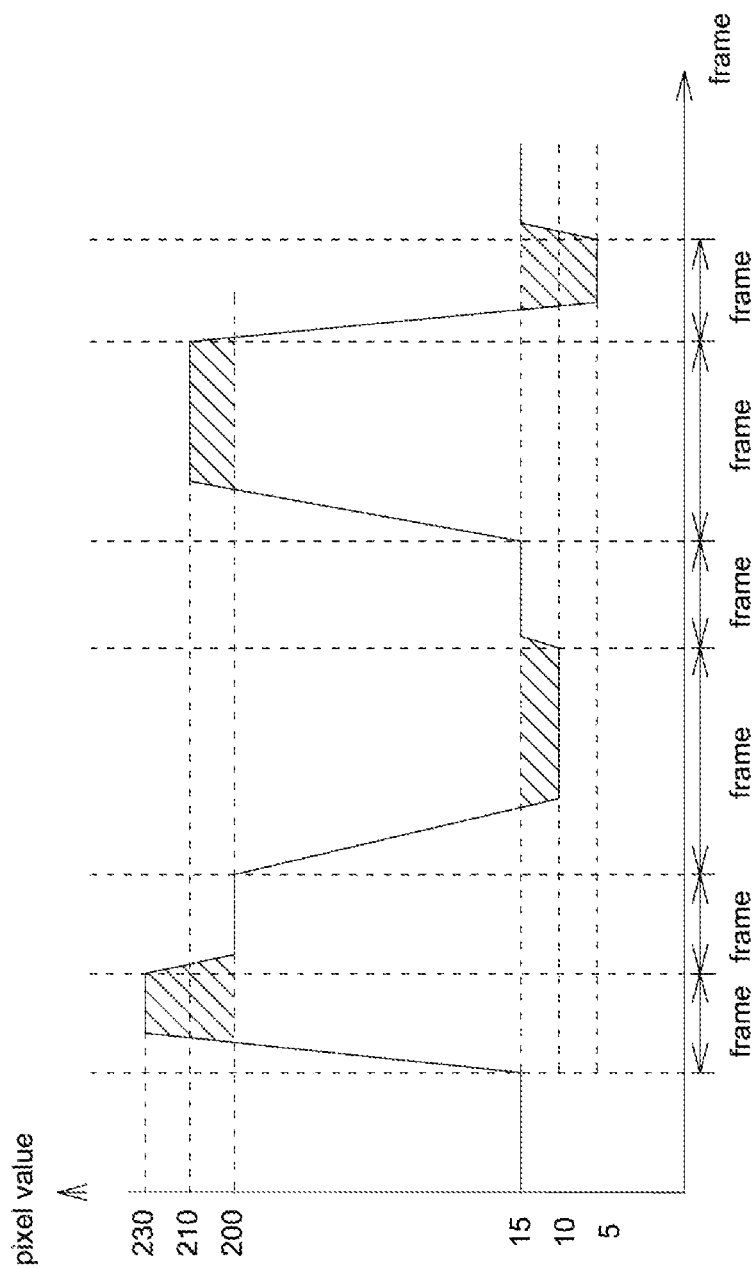
FIG. 4 is a schematic diagram of an operation of a response time enhancing circuit according to another embodiment of the present invention.

FIG. 4 shows a schematic diagram of an operation of the response time enhancing circuit 140 according to another embodiment of the present invention. As shown in FIG. 4, the frame rate of multiple consecutive frames dynamically changes. When the frame rate is higher, the response time enhancing circuit 140 adopts a greater response time enhancement intensity; that is, the difference between the adjusted pixel value and the target pixel value (the actual pixel value) is larger. When the frame rate is lower, the response time enhancing circuit 140 adopts a smaller response time enhancement intensity; i.e., the difference between the adjusted pixel value and the target pixel value (the actual pixel value) is smaller. Through the technical solution that dynamically adjusts the response time enhancement intensity according to the frame rate, image quality is maintained for image display while response time enhancement is achieved.

Figure 5:
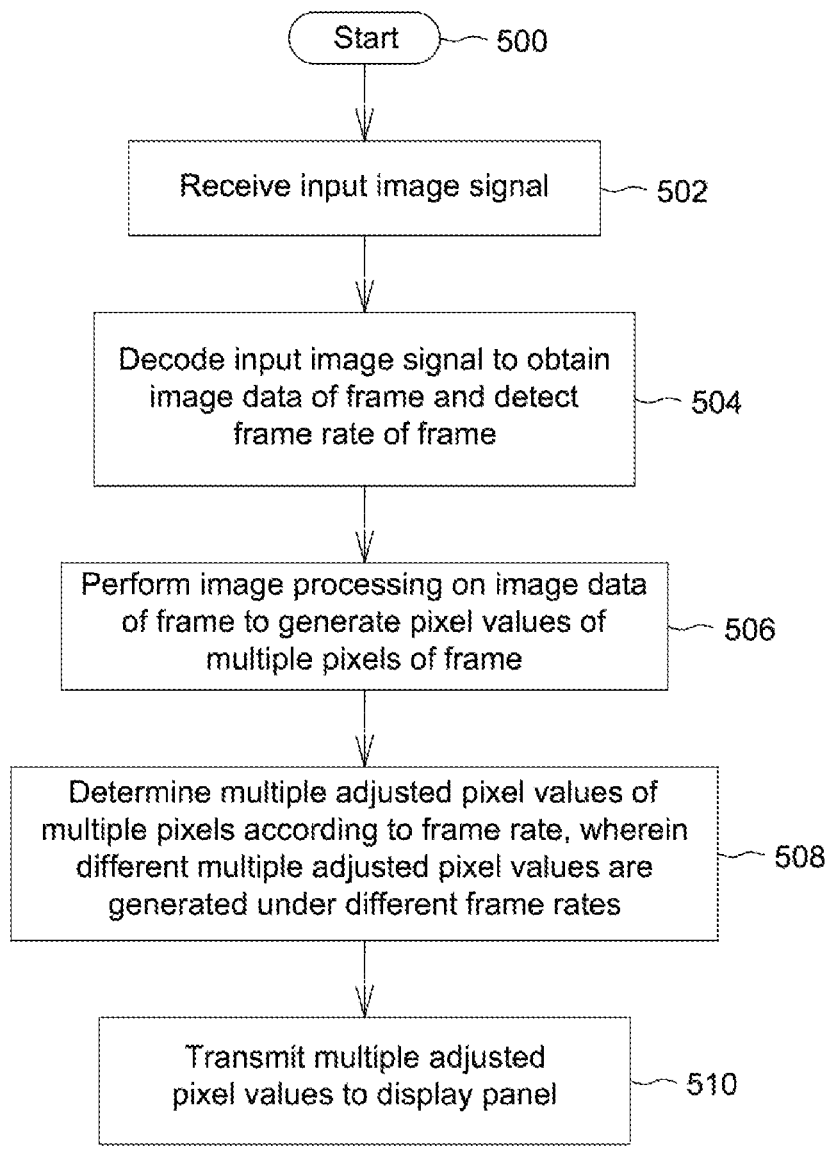
FIG. 5 is a flowchart of an image display method applied to a display according to an embodiment of the present invention.

FIG. 5 shows a flowchart of an image display method applied to a display according to an embodiment of the present invention. Referring to the disclosure associated with FIG. 1 to FIG. 4, details of the process in FIG. 5 are described below.

In step 500, the process begins.

In step 502, an input image signal is received.

In step 504, the input image signal is decoded to obtain image data of a frame, and a frame rate of the frame is detected.

In step 506, image processing is performed on image data of the frame to generate pixel values of multiple pixels of the frame.

In step 508, multiple adjusted pixel values of the multiple pixels are determined according to the frame rate, wherein different adjusted pixel values are generated under different frame rates.

In step 510, the multiple adjusted pixel values are transmitted to a display panel.

In conclusion, in the device and image display method applied to a display, the response time enhancement intensity dynamically changes according to the frame rate. Further, the response time enhancement intensity is weaker as the frame rate gets lower, so as to prevent side-effects on image display from being emphasized due to the lower frame rate. Therefore, the present invention is capable of maintaining image quality of image display while response time enhancement is achieved.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A device, applied to a display, comprising:
a receiving circuit, receiving an input image signal;
a detecting circuit, coupled to the receiving circuit, detecting a frame rate of image data of a frame in the input image signal;
an image processing circuit, coupled to the detecting circuit, performing image processing on the image data of the frame to generate a plurality of target pixel values of a plurality of pixels of the frame; and
a response time enhancing circuit, coupled to the detecting circuit and the image processing circuit, determining a plurality of adjusted pixel values of the plurality of pixels according to the frame rate, and outputting the plurality of adjusted pixel values to a display panel; wherein, for a pixel among the plurality of pixels, the adjusted pixel values that the response time enhancing circuit generates for the pixel under different input frame rates are different,
wherein the response time enhancing circuit determines that the pixel has a first adjusted pixel value when the frame rate has a first frame rate, and has a second adjusted pixel value when the frame rate has a second frame rate lower than the first frame rate; a difference between the second adjusted pixel value and the target pixel value of the pixel is lower than a difference between the first adjusted pixel value and the target pixel value.

2. The device according to claim 1, wherein as the frame rate gets lower, the adjusted pixel value that the response time enhancing circuit determines for the pixel gets closer to the target pixel value that the image processing circuit outputs for the pixel.

3. The device according to claim 1, further comprising:
a storage unit, storing a plurality of look-up tables (LUTs), the LUTs respectively corresponding to different input frame rates;
wherein, the response time enhancing circuit selects a corresponding LUT from the LUTs in the storage unit, and determines the adjusted pixel value for the pixel from the corresponding LUT according to the target pixel value of the pixel.

4. The device according to claim 3, wherein the plurality of LUTs respectively correspond to different frame rate intervals.

5. The device according to claim 3, wherein the response time enhancing circuit determines the adjusted pixel value for the pixel from the corresponding LUT according to the target pixel value of the pixel of the frame and a pixel value of the pixel of a previous frame.

6. The device according to claim 1, disposed in a television, wherein the frame rate of the input image signal received by the receiving circuit dynamically changes.

7. An image display method, applied to a display, comprising:
receiving an input image signal;
detecting a frame rate of image data of a frame in the input image signal;
performing image processing on the image data of the frame to generate a plurality of target pixel values of a plurality of pixels of the frame; and
determining a plurality of adjusted pixel values of the plurality of pixels according to the frame rate, and outputting the plurality of adjusted pixel values to a display panel; wherein, for a pixel among the plurality of pixels, the adjusted pixel values of the pixel under different input frame rates are different,
wherein the step of determining the plurality of adjusted pixel values of the plurality of pixels according to the frame rate and outputting the plurality of adjusted pixel values to the display panel comprises:
determining that the pixel has a first adjusted pixel value when the frame rate has a first frame rate; and
determining that the pixel has a second adjusted pixel value when the frame rate has a second frame rate lower than the first frame rate;
wherein a difference between the second adjusted pixel value and the target pixel value of the pixel is lower than a difference between the first adjusted pixel value and the target pixel value.

8. The method according to claim 7, wherein
the adjusted pixel value determined for the pixel gets closer to the target pixel value of the predetermined pixel value as the frame rate gets lower.

9. The method according to claim 7, further comprising:
providing a plurality of look-up tables (LUTs), the LUTs respectively corresponding to different input frame rates;
wherein, the step of determining the plurality of adjusted pixel values of the plurality of pixels according to the frame rate and outputting the plurality of adjusted pixel values to the display panel comprises:
selecting a corresponding LUT from the LUTs according to the frame rate; and
determining the adjusted pixel value of the pixel from the corresponding LUT according to the target pixel value of the pixel.

10. The method according to claim 9, wherein the plurality of LUTs respectively correspond to different frame rate intervals.

11. The method according to claim 9, wherein the step of determining the adjusted pixel value of the pixel from the corresponding LUT according to the target pixel value of the pixel comprises:
determining the adjusted pixel value of the pixel from the corresponding LUT according to the target pixel value of the pixel of the frame and a pixel value of the pixel of a previous frame.

12. The method according to claim 7, applied to a television, wherein the frame rate of the input image signal dynamically changes.

* * * * *